US012775437B2

(12) United States Patent
Kuhrt

(10) Patent No.: US 12,775,437 B2
(45) Date of Patent: Oct. 27, 2026

(54) METHOD AND SYSTEM FOR VOICE CONTROL OF A DEVICE

(71) Applicant: Siemens Healthineers AG, Forchheim (DE)

(72) Inventor: Soeren Kuhrt, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 227 days.

(21) Appl. No.: 18/644,612

(22) Filed: Apr. 24, 2024

(65) Prior Publication Data

US 2024/0361973 A1 Oct. 31, 2024

(30) Foreign Application Priority Data

Apr. 28, 2023 (EP) .................................... 23170532

(51) Int. Cl.
*G06F 3/16* (2006.01)
*G06V 40/16* (2022.01)

(52) U.S. Cl.
CPC ................ *G06F 3/16* (2013.01); *G06V 40/16* (2022.01)

(58) Field of Classification Search
None
See application file for complete search history.

(56) References Cited

U.S. PATENT DOCUMENTS

2011/0235870 A1* 9/2011 Ichikawa ................ G06F 21/32 382/118
2015/0237222 A1 8/2015 Haider et al.
2018/0268812 A1* 9/2018 Kim ........................ G10L 15/22
2020/0360098 A1* 11/2020 Cagle ..................... A61B 34/30
2022/0101847 A1 3/2022 Receveur et al.
2023/0079180 A1 3/2023 Kuhrt et al.

FOREIGN PATENT DOCUMENTS

DE 102006045719 B4 8/2008
DE 102014202893 A1 8/2015
DE 202017106586 U1 6/2018

OTHER PUBLICATIONS

Vaswani, A. et al.:“Attention Is All You Need”, in: 31st Conference on Neural Information Processing Systems (NIPS 2017), Long Beach, CA, USA.
Facial recognition system, from Wikipedia, the free encyclopedia (https://en.wikipedia.org/wiki/Facial_recognition_system).

* cited by examiner

*Primary Examiner* — Hemant S Patel
(74) *Attorney, Agent, or Firm* — Harness, Dickey & Pierce, P.L.C.

(57) ABSTRACT

Methods and systems are provided for voice control of a device which are based in particular on a recording of an audio signal via an audio recording device and a recording of an image signal from an environment of the device via an image recording device. A method includes analyzing the image signal in order to provide an image analysis result, processing the audio signal using the image analysis result in order to provide an audio analysis result, and generating a control signal for controlling the device based on the audio analysis result in order to input said control signal into the device.

15 Claims, 2 Drawing Sheets

METHOD AND SYSTEM FOR VOICE CONTROL OF A DEVICE

CROSS-REFERENCE TO RELATED APPLICATION(S)

The present application claims priority under 35 U.S.C. § 119 to European Patent Application No. 23170532.8, filed Apr. 28, 2023, the entire contents of which is incorporated herein by reference.

FIELD

One or more example embodiments of the present invention relates to a method for voice control of a device. For example, one or more example embodiments of the present invention relates to a method for voice control based on an audio and a video signal. For example, one or more example embodiments of the present invention relates to a method for voice control of a medical device. One or more example embodiments of the present invention further relates to a voice analysis device for voice control of a device, such as a medical device, as well as to a medical system comprising the voice analysis device and the medical device.

Independent of the grammatical term usage, individuals with male, female or other gender identities are included within the term.

RELATED ART

Medical devices are typically used for treating and/or examining a patient. For example, medical imaging modalities are employed as medical devices for examining a patient. Such imaging modalities may comprise e.g. magnetic resonance devices, computed tomography devices, PET devices (positron emission tomography devices), etc. Other devices used for treating a patient include intervention and/or therapy devices, such as, for instance, a radiation therapy or radiotherapy device, a device for performing an intervention, in particular a minimally invasive intervention, and the like.

In this context, the treatment and/or examination of the patient via the medical device are/is typically supported by an operator, for example a member of the nursing staff, technical personnel, radiology assistants or physicians.

Before and while a treatment and/or examination of a patient is performed via such a medical device, it is usually necessary to complete various settings on the medical device, such as, for example, an input of patient data, an adjustment of different device parameters and the like. These steps are typically performed by the operator, wherein the settings of the medical device are typically made via a physical user interface provided on the device, into which interface an operator can enter inputs.

A frictionless workflow or process sequence is desirable in order to operate such medical devices cost-effectively. In particular, the process of selecting settings should be designed to be as simple as possible. In this regard, DE 10 2006 045 719 B4 describes a medical system with voice input device in which specific functions of the system can be activated and deactivated via voice control. In this case an audio signal captured via the voice input device is processed via a voice analysis module in order to determine one or more voice commands of an operator.

SUMMARY

A problem that often arises in the voice control of complex systems is a conflict of interest between the speed of the voice analysis necessary for many applications and an optimally correct and complete recognition of the user intent of the operator formulated via natural language. Furthermore, the voice input of the operator must be distinguished from other sources of noise. This is critical in particular when other inputs formulated in natural language are present that do not originate from the operator and consequently must not be implemented within a voice control context.

Overly long analysis times can lead to unnecessary waiting times for the operator and consequently to frustration. On the other hand, a voice analysis focused solely on speed can lead to an incorrect or incomplete instruction being carried out and cause errors, which is often not acceptable particularly in the medical context.

It is therefore an object of the present invention to solve this problem and to provide a method for voice control of a device which permits an identification of voice commands from an operator that is improved in this respect. In particular, such a method is intended to enable the actual user intent to be registered in an as error-free manner as possible. It is also an object of the present invention to disclose a voice analysis device for voice control of a device on this basis, wherein the device may in particular be a medical device. It is furthermore an object of the present invention to disclose an (in particular medical) system comprising the (in particular medical) device and a corresponding voice analysis device (i.e. performing the methods).

According to the invention, the posed object is achieved via a method for voice control of a device, a voice analysis device, a system comprising the voice analysis device, a computer program product, and a computer-readable storage medium according to the main claim and the independent coordinated claims. Advantageous developments are disclosed in the dependent claims.

BRIEF DESCRIPTION OF THE DRAWINGS

Further specific details and advantages of the invention will become apparent from the following explanations of exemplary embodiments with reference to schematic drawings. Modifications cited in this context can in each case be combined with one another in order to form new embodiments. The same reference signs are used for like features in different figures.

In the figures.

DETAILED DESCRIPTION

Figure 1:
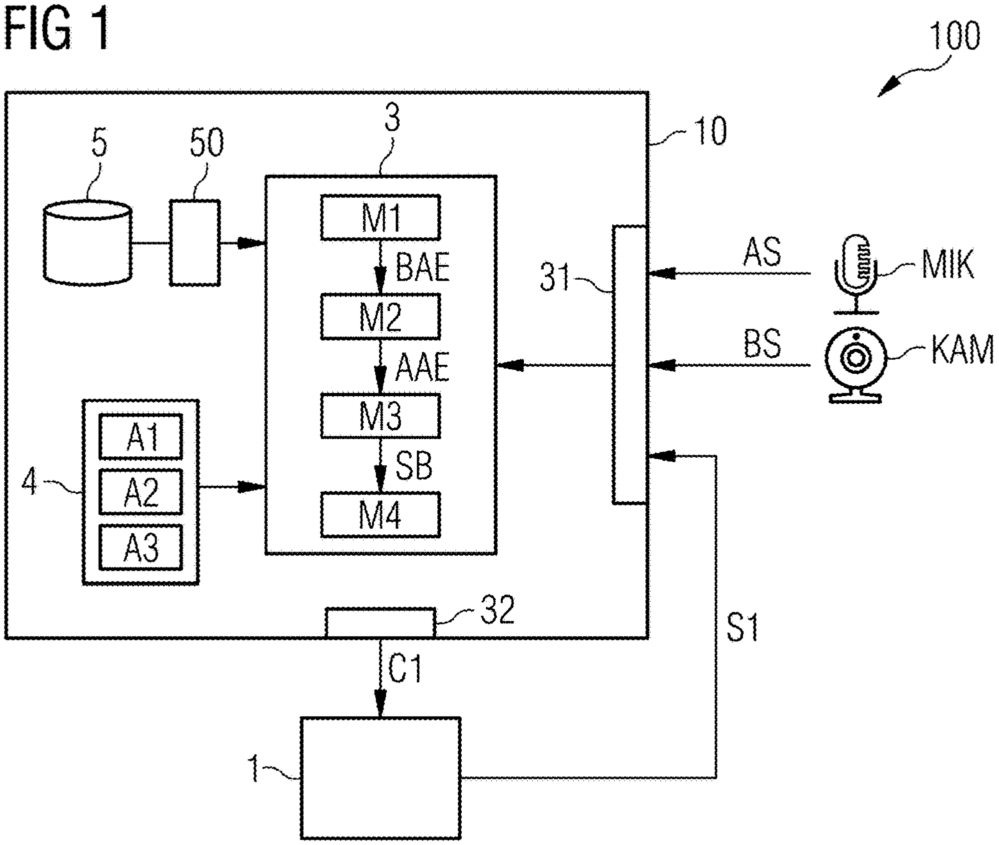
FIG. 1 shows a schematic block diagram of a system for controlling a medical device according to one embodiment.

An inventive achievement of the object is described below both in relation to the claimed devices and in relation to the claimed methods. Features, advantages or alternative embodiments mentioned in this context are equally to be applied also to the other claimed subject matters, and vice versa. In other words, the object-related claims (which are directed for example to voice analysis devices and associated systems) may also be developed with the features described or claimed in connection with a method. The corresponding functional features of the method are in this case embodied via corresponding object-related features.

According to one aspect, a computer-implemented method for voice control of a device is provided. The method comprises a number of steps. One step is directed to a recording of an audio signal via an audio recording device. One step is directed to a recording of an image signal of an environment of the device via an image recording device. One step is directed to an analysis of the image signal for providing an image analysis result. One step is directed to a processing of the audio signal using the image analysis result for providing an audio analysis result. One step is directed to a generation of a control signal for controlling the device based on the audio analysis result. One step is directed to an input of the control signal into the device.

The device may be regarded as a physical device that is intended to be controlled via voice input. The device is initially not limited further and can relate to any technical device which is designed for voice control. This can comprise e.g. a digital voice recorder, a computer, an onboard computer of a vehicle, a robot, a machine and the like.

According to some examples, the physical device comprises a medical device. The medical device can be embodied in particular to perform and/or support a medical procedure. The medical procedure can comprise an imaging and/or interventional and/or therapeutic procedure, as well as a monitoring of a patient. In particular, the medical device can comprise an imaging modality, such as, for example, a magnetic resonance device, a single-photon emission tomography device (SPECT device), a positron emission tomography device (PET device), a computed tomography device, an ultrasound device, an X-ray device or an X-ray device embodied as a C-arm device. The imaging modality can also be a combined medical imaging device which comprises an arbitrary combination of several of the cited imaging modalities. Furthermore, the medical device can comprise an intervention and/or therapy device, such as e.g. a biopsy device, a radiation therapy or radiotherapy device for irradiating a patient, and/or an intervention device for performing an, in particular minimally invasive, intervention. According to further implementations, the medical device can additionally or alternatively comprise patient monitoring modules, such as e.g. an ECG device, and/or a patient care device, such as e.g. a ventilator device, an infusion device and/or a dialysis machine.

The audio signal can include in particular sound information. In particular, the audio signal can contain sound information from an environment of the device. In particular, the audio signal can be an audio signal from an environment of the device or comprise such an audio signal.

The audio signal can be an analog or digital or digitized signal. The digitized signal can be generated starting from the analog signal e.g. via an analog-to-digital converter. Accordingly, the step of receiving can comprise a step of providing a digitized audio signal based on the received audio signal or a digitizing of the received audio signal. The receiving of the audio signal can in particular comprise a registering and/or recording of the audio signal via the audio receiving device.

The audio signal can in this case comprise a communication from a person (hereinafter also an operator), such as e.g. an instruction that is to be carried out or a question. In other words, the audio signal can comprise a voice input of the operator in natural language. Typically, a language spoken by human beings is referred to as a natural language. Natural language can also possess an intonation and/or a speech melody for modulating the communication. In contrast to formal languages, natural languages can exhibit structural and lexical ambiguities.

The audio recording device may be embodied as part of the device or independently of the latter. The audio recording device may comprise one or more microphones. The audio recording device may comprise one or more directional microphones.

The image signal may in particular comprise a video signal from an environment of the device. The image signal may contain a video stream of an environment of the device. The image signal may be recorded in parallel and in particular concurrently with the audio signal. The image signal may be registered with the audio signal with respect to time.

The image signal can be an analog or digital or digitized signal. The digitized signal can be generated starting from the analog signal e.g. via an analog-to-digital converter. Accordingly, the step of receiving can comprise a step of providing a digitized image signal based on the received image signal or a digitizing of the received image signal. The receiving of the image signal can in particular comprise a registering and/or recording of the image signal via the image recording device. The image signal can in particular comprise at least one temporal sequence of two-dimensional images of an environment of the device, wherein the individual images can contain M times N picture elements or pixels which encode the image information.

The image signal may in this case comprise an image or video recording of one or more persons, in particular including an operator, in an environment of the device.

The image recording device may be embodied as part of the device or independently of the latter. The image recording device may comprise one or more cameras. The image recording device may be integrated with the audio recording device.

According to some examples, the term "person" may refer to any persons located in an environment of the device, whereas the term "operator" can designate a person authorized to operate the device. Persons can comprise e.g. patients, relatives, auxiliary staff, medical-technical assistants, physicians, etc. Operators can comprise e.g. medical-technical assistants or physicians.

The image signal can be analyzed substantially in real time. An analysis substantially in real time means that the signal is analyzed continuously. In other words, a "rolling" analysis of the signal takes place. There is therefore no waiting until e.g. a voice input of an operator is completed in order to analyze the image signal only thereafter.

In general, the image signal can be analyzed using image data analysis or image data evaluation means. The analyzing step may comprise applying one or more image analysis algorithms to the image signal.

The image analysis result can include at least one piece of information, in particular visual information, relevant to the analysis of the audio signal, in particular from an environment of the device.

In particular, the image analysis result can comprise visual information about a person, and in particular about an operator, in an environment of the device. The information can in this case be extracted from the image signal in the step of analyzing the image signal, e.g. by applying one or more image analysis algorithms.

In principle, known algorithms can be used for the image analysis, said algorithms being designed for example for recognition of persons and/or faces and/or lip movements. In this context, reference is made by way of example to https://en.wikipedia.org/wiki/Facial_recognition_system. The technologies presented and/or referenced therein (but, of course, others also) can be used as image analysis algorithms and consequently for providing the image analysis result. For an example of facial and hence person recognition in the medical environment, reference may be made to the disclosure of DE 10 2014 202 893 A1, the contents of which are incorporated by reference in their entirety in the present application.

The analysis of the audio signal for providing the audio analysis result can in particular take place substantially in real time. In some embodiments, the analysis of the audio signal is dependent on the image analysis result in this case.

The audio analysis result may in this case be understood as a type of intermediate result on the basis of which the control commands can subsequently be generated. Accordingly, the audio analysis may be understood as a type of preprocessing of the audio signal. The audio analysis result can in this case comprise in particular components of the audio signal that have been extracted from the latter, such as e.g. specific frequency ranges and/or temporal segments. According to embodiments, the step of analyzing the audio signal can comprise a filtering of the audio signal.

A method for processing natural language can furthermore be used for the analysis of the audio signal. In particular, a computational linguistics algorithm can be applied to the audio signal for this purpose. One possibility for processing the voice input formulated in natural language in order to provide the voice analysis result is to convert the voice input formulated in natural language into text (i.e. structured language) via a speech-to-text (software) module. A further analysis for providing the voice analysis result, for example via latent semantic indexing (LSI for short), can subsequently attribute a meaning to the text. Thus, a voice analysis, and in particular an understanding of the natural language contained in the voice input (NLU), can be performed already before the voice input is terminated. In this way e.g. voice inputs can be recorded continuously and provided as the audio analysis result for further processing.

The analysis of the audio signal can in this case take place substantially in real time. An analysis substantially in real time means that the audio signal is analyzed continuously. In other words, a "rolling" analysis of the audio signal or of the voice input contained therein takes place. There is therefore no waiting until the voice input of the operator is completed in order to analyze the voice input as a whole thereafter.

According to embodiments, based on the image analysis result can mean that the image analysis result is taken into account in the analysis of the audio signal. For example, this can comprise filtering the audio signal based on the image analysis result and in particular truncating and/or verifying the audio signal. In particular, this can mean that the audio signal is filtered based on visual information from an environment of the device and in particular is truncated and/or verified.

This step is directed to the subsequent processing of the audio analysis result in order to provide one or more control signals.

The control signals can be executed in particular via a separate (second) computational linguistics algorithm which is applied to the audio analysis result. The second computational linguistics algorithm can in particular include a speech-to-text (software) module. For the further analysis and in order to identify one or more voice commands, the second computational linguistics algorithm can additionally or alternatively comprise a speech recognition (software) module (NLU module) which can attribute a meaning to the voice data stream for example via LSI.

Via the two-part processing (part 1 for tailored filtering of the voice input using image analysis results, and part 2 for the following analysis of the audio analysis result) a reliable identification of voice commands can be achieved (which normally requires the analysis of the entire audio analysis result).

In some examples it can be provided that initially one or more voice commands are identified in the audio analysis result, which voice commands can then be converted in a further processing step into one or more control signals for the device.

By recording a video signal from the environment of the device it is possible to obtain visual information which can be used in the analysis of the audio signal. This enables the analysis of the audio signal to be improved, as a result of which in turn an error proofing of the voice analysis and consequently of the voice control of the device can be improved.

According to one aspect, the step of generating a control signal comprises identifying one or more voice inputs in the audio analysis result and generating the control signal based on the one or more voice inputs.

In other words, a two-stage processing scheme is thus realized which combines a situative preprocessing of the audio signal with a holistic analysis of the thus generated audio analysis result. The latter is advantageous because additional information can be obtained via a holistic analysis. Thus, e.g. in the analysis of word embeddings related to the voice input, it is possible to refer to the textual context in both temporal directions.

According to one aspect, the step of identifying one or more voice inputs comprises recognizing individual words or word groups in the audio analysis result, in particular via a method for recognizing natural language (NLU) and/or via a semantic analysis.

According to one aspect, the step of generating the control signal based on the one or more voice inputs comprises comparing or correlating the one or more voice inputs with a predefined set of possible voice commands for the device. The predefined set of possible voice commands may be present e.g. in the form of a command library.

According to one aspect, the processing of the audio signal comprises providing an audio analysis algorithm (also first computational linguistics algorithm) which is embodied to provide an audio analysis result based on an audio signal, on the basis of which audio analysis result control signals for controlling the device can be determined, and applying the audio analysis algorithm to the audio signal.

The audio analysis algorithm can be embodied for processing audio frequencies. In particular, the audio analysis algorithm can be embodied for filtering an audio signal and in particular for identifying voice frequencies. In particular, the audio analysis algorithm can be embodied for frequency analysis. In particular, the audio analysis algorithm can be embodied for detecting a start and/or an end of a voice input in particular based on a frequency analysis of the audio signal. In particular, the audio analysis algorithm can be embodied for recognizing an identity of a speaker in particular based on a frequency analysis of the audio signal. According to embodiments, the audio analysis algorithm is not embodied for processing natural language, in particular not for recognizing a meaning contained in natural language.

According to one aspect, generating the control signal and in particular the step of identifying one or more voice inputs comprises providing a (second) computational linguistics algorithm which is embodied to identify voice inputs in audio analysis results, and applying the (second) computational linguistics algorithm to the audio analysis result.

The audio analysis algorithm can accordingly be embodied to process an audio signal in such a way that an audio analysis result is provided for further processing via the (second) computational linguistics algorithm.

The computational linguistics algorithm can accordingly be embodied to identify one or more voice inputs or voice commands for controlling the device based on the audio analysis result.

The computational linguistics algorithm can comprise one or more known voice analysis algorithms and in particular one or more machine learning algorithms.

According to some embodiments, the computational linguistics algorithm comprises a construct known as a transformer network. A transformer network is a neural network architecture which generally comprises an encoder and/or a decoder. Here, encoder and/or decoder can in each case comprise a plurality of encoder or decoder layers. A technique referred to as an attention mechanism is implemented within the layers. The attention mechanism links individual components of the audio analysis result, such as individual words, to other components of the audio analysis result. This enables the computational linguistics algorithm to determine the relative importance of individual words in the audio analysis result with respect to other words in the audio analysis result and thus determine the linguistic content of the audio analysis result and consequently one or more voice inputs. For further details with regard to a possible implementation, reference is made to Vaswani et al., "Attention Is All You Need", in arXiv: 1706.03762, Jun. 12, 2017, the contents of which are incorporated by reference in their entirety in the present application.

According to one aspect, the audio analysis algorithm can be implemented as a front-end algorithm which is hosted e.g. in a local computing unit, such as e.g. in the control unit of the device or in a local voice recognition module. As a front-end, the processing can be performed particularly well in real time such that the result can be obtained practically without any significant time delay. The (second) computational linguistics algorithm can be implemented analogously as a back-end algorithm which is hosted e.g. in a remote computing device, such as e.g. a real server-based computing system or a virtual cloud computing system. In particular complex analysis algorithms which require high computing power can be employed in a back-end implementation.

Accordingly, the method can comprise a forwarding of the audio analysis result to a remote computing device and a receiving of one or more voice inputs by the remote computing device, on the basis of which the control signals are then generated in the generation step.

In alternative implementations, the second computational linguistics algorithm can also be implemented as a front-end algorithm. Conversely, the first computational linguistics algorithm can also be implemented as a back-end algorithm.

According to one aspect, the method further comprises a receiving of a system status from the device, which system status comprises information relating to a current state of the device, the step of generating the control signal being performed based on the system status.

The system status can in this case be specified via a respective operating step a succession or sequence of operating steps currently being performed by the device. As a result of the current system status being taken into account, control signals can be determined in a more targeted manner.

According to one aspect, the audio signal contains a voice input of a person, and the image signal contains an image taken of the person and in particular an image taken of the person's face.

In other words, the person can be recorded by two different media, thereby enabling a targeted analysis of the audio signal. According to some examples, the image analysis result comprises visual information of the person and/or the audio analysis result comprises audio information of the person.

According to one aspect, the step of recording the image signal comprises aligning the image recording device onto the person and in particular onto the person's face.

An automatic alignment of the image recording device enables visual information about the person to be acquired in a targeted manner, thus allowing an improved analysis of the audio signal. According to some examples, the alignment comprises determining positional information of the person in an environment of the device based on the audio signal and an alignment of the image recording device based on the positional information.

Such positional information can be obtained for example by using a plurality of individual microphones spatially separated from one another one or more directional microphones in the audio recording device.

According to one aspect, the step of analyzing the image signal comprises recording a speech activity of the person and the image analysis result comprises the speech activity.

A speech activity can in particular comprise visual information indicating that the person is currently speaking.

According to some examples, the step of recording the speech activity comprises capturing a lip movement of the person.

The analysis of the audio signal can be made more precise as a result of the speech activity. If, for example, no (visual) speech activity is detected in the image signal, an analysis of the audio signal can be dispensed with. Furthermore, a speech activity detected acoustically in the audio signal can be verified. This enables the analysis of the audio signal and consequently the voice control to be improved, thereby increasing error proofing.

According to one aspect, the step of analyzing the image signal comprises recognizing the person and the image analysis result comprises an identity of the person.

According to one aspect, recognizing the person comprises providing a facial recognition algorithm and applying the facial recognition algorithm to the image signal.

The facial recognition algorithm can in this case be embodied to recognize faces in image signals and assign them to a predetermined identity in order thereby to provide the identity. The assignment can comprise selecting from a plurality of predetermined identities, wherein a person authorized to operate the device is assigned to the predetermined identities in each case. If no assignment can be made, "unknown" can be output as the identity.

According to one aspect, the recognition comprises recognizing the person whose speech activity was recorded, and the image analysis result comprises an identity of the person whose speech activity was recorded.

By establishing an identity of a person in the environment of the device, and in particular an identity of a speaking person, operating errors can be avoided, thus increasing the reliability of the voice control.

According to some examples, the step of analyzing the audio signal comprises identifying the person and the voice analysis result comprises a second identity of the person.

According to some examples, the method comprises verifying the identity of the person having the second identity (and vice versa).

According to some examples, identifying the person on the basis of the audio signal can comprise identifying an audio signature of the person in the audio signal. This can be realized for example via a correspondingly embodied audio analysis algorithm.

According to one aspect, the step of analyzing the image signal comprises authenticating the person as authorized to operate the device based on the identity, and the step of processing the audio signal and/or the step of generating the control signal and/or the step of inputting the control signal are performed only if the person was authenticated in the authentication step as authorized to operate the device.

According to some examples, the authentication comprises authenticating the person whose speech activity was recorded.

As a result of the authentication step it is possible on the one hand to increase the level of operating safety since in this way only the voice signals of authorized persons can be taken into account. On the other hand, the processing can be organized more efficiently since the further processing of the audio signal only takes place provided an authorized operator has been identified.

According to one aspect, the step of processing the audio signal comprises detecting a start of a voice input in the audio signal based on the image analysis result, detecting an end of the voice input based on the image analysis result, and providing a voice data stream based on the audio signal between the detected start and the detected end as the audio analysis result. The step of generating the control signal is performed based on the voice data stream.

The voice data stream can comprise or be based on the digitized audio signal between the detected start and the detected end. The voice data stream can be provided for example in the form of a recording of the audio signal between detected start and detected end. Accordingly, the providing step can comprise a recording of the audio signal and/or the voice input between the detected start and the detected end and a providing of the recording as the voice data stream. In this case the voice data stream can be provided in particular for the further analysis of the voice data stream, e.g. in order to identify one or more voice commands in the voice data stream. Accordingly, the step of providing can comprise a providing of the voice data stream for a corresponding voice recognition module or a corresponding (second) computational linguistics algorithm or comprise an inputting of the voice data stream into the voice recognition module or the corresponding (second) computational linguistics algorithm for identifying one or more voice commands in the voice data stream.

A decision can be specified dynamically at the start and termination of the voice input based on the image analysis result. In this case the evaluation of the image analysis result enables a reliable voice start and voice end detection and consequently an improved level of operating safety. Thus, on the basis of the image analysis result it is possible e.g. to avoid waiting an excessively long time for further voice inputs of the person, which means unnecessary waiting times for the user. Conversely, it is also possible to avoid regarding the voice input as terminated too early, which can lead to an evaluation of an incomplete instruction and cause errors.

According to some examples, the step of detecting the start and/or the step of detecting the end are based on the (visual) speech activity and/or on a detected presence of a person, in particular an authenticated one.

Thus, a start of the voice input can advantageously be established e.g. on the basis of a start of a speech activity or a presence of a person authorized to operate the device. Conversely, the voice input can be regarded as terminated when (possibly after a predetermined waiting time) no further speech activity is established or no authorized person is present any longer in the environment of the device.

According to one aspect, the step of processing the audio signal comprises detecting an acoustic start of a voice input in the audio signal based on an analysis of the audio signal and detecting an acoustic end of the voice input in the audio signal based on an analysis of the audio signal, the detection of start and end being realized based in addition on the acoustic start and the acoustic end. In particular, the acoustic start and the acoustic end can in this case be synchronized with the start and end detected based on the image analysis result.

By additionally taking an acoustically detected start and end into account, the audio signal can be reliably filtered for the further processing. This increases the error proofing of the voice control.

According to one aspect, the step of processing the audio signal comprises generating a verification signal based on the image analysis result in order to confirm the audio analysis result, and in particular a voice input contained in the audio signal, and the step of generating the control signal is performed based on the verification signal.

The verification signal can generally be suitable for verifying a processing result of the audio signal. According to some examples, the step of generating the control signal comprises identifying a voice input in the audio analysis result. According to some examples, the audio analysis result comprises a voice input identified in the audio signal. In particular, a control signal can be generated or input into the device only when the verification signal confirms the audio analysis result (a voice input).

By generating a verification signal based on the image analysis result it is possible to conduct an independent check on the audio analysis result. This increases the error proofing and hence the reliability of the method.

According to one aspect, the image analysis result comprises a detection of a person, and the verification signal is based on a presence of the person (in particular in an environment of the device).

The verification signal can be embodied in particular to confirm the audio analysis result (a voice input) when a person is present. In particular, a control signal can be generated or input into the device only when a presence of a person has been detected.

By evaluating the presence or by generating or inputting the control signal only when a presence of a person has been detected it is possible to ensure that an actual voice input is present and that, for instance, interfering or background noises are not analyzed. Both the error proofing and the efficiency of the method are increased as a result.

According to one aspect, the image analysis result comprises a (visual) speech activity of a person, and the verification signal is based on determining a temporal coherence of the speech activity and the audio analysis result (in particular a voice input contained in the audio analysis result).

According to one aspect, the step of processing the audio signal comprises detecting an (acoustic) speech activity of the person (e.g. on the basis of a frequency analysis of the audio signal), wherein the temporal coherence is based on a comparison of the visual with the acoustic speech activity.

In other words, the verification signal can be based on a check to establish whether a visually determined (based on the image signal) speech activity coincides with respect to time with an acoustically determined (based on the audio signal) speech activity. For example, it can be checked whether recorded lip movements “match” with respect to time with a detected voice input.

In particular, the verification signal can be embodied to confirm the audio analysis result (a voice input) when the (visually established) speech activity is coherent with respect to time with the audio analysis result (or a voice input or an acoustically established speech activity). In particular, a control signal can be generated or input into the device only when a temporal coherence between the (visually established) speech activity and the audio analysis result (or a voice input or an acoustically established speech activity) has been detected.

Via the check for a temporal coherence it can be ensured that an actual voice input is present. Both the error proofing and the efficiency of the method are increased as a result.

According to one aspect, the image analysis result comprises an identity of a person, and the verification signal is based on an authentication of the person as authorized to operate the device based on the identity.

In other words, a visual authentication of the person takes place for verifying the audio analysis result (or a voice input). By this means it can be checked whether the voice input of an authorized person is evaluated. In particular, a control signal can be generated or input into the device only when the person has been authenticated as authorized to operate the device. The operating reliability of the method can be increased as a result.

According to one aspect, the image analysis result comprises a speech activity of a person and an identity of the person, and the verification signal is based on an authentication of the person as authorized to operate the device based on the identity.

By this means it can be checked in a targeted manner whether the person currently speaking is authorized to operate the device, thus further increasing the level of operating safety.

According to one aspect, the verification signal can additionally be based on a determination of a temporal coherence of the speech activity and the audio analysis result (in particular a voice input of the person contained in the audio analysis result).

According to one aspect, the processing of the audio signal comprises establishing an acoustic identity of the person (e.g. based on a frequency analysis of the audio signal), wherein the verification signal is based on a comparison of the identity with the acoustic identity, wherein an authentication of the person as authorized to operate the device takes place in particular only when the acoustic identity and the identity match. The level of operating safety can be increased further as a result.

According to one aspect, a voice analysis device (or a voice control module) is provided for voice control of a device which comprises an interface and a control device. The interface is embodied to receive an audio signal captured via an audio recording device and an image signal captured from an environment of the device via an image recording device. The control device is embodied to analyze the image signal in order to provide an image analysis result, to process the audio signal using the image analysis result in order to provide an audio analysis result, to generate a control signal for controlling the device based on the audio analysis result, and to input the control signal into the device.

The control device can be embodied as a central or decentralized computing unit. The computing unit can comprise one or more processors. The processors can be embodied as a central processing unit (CPU for short) and/or as a graphics processing unit (GPU for short). In particular, the control device can be implemented as a, or as part of a, physical device designed to be controlled by voice input. Alternatively, the controller can be implemented as a local, real and/or cloud-based processing server. The controller may further comprise one or more virtual machines. According to further implementations, the voice analysis device further comprises a voice recognition module which is embodied to determine one or more voice commands/control signals based on the audio analysis result.

The interface can be embodied generally for data interchange between the control device and further components. The interface can be implemented in the form of one or more individual data interfaces which may include a hardware and/or software interface, e.g. a PCI bus, a USB interface, a FireWire interface, a ZigBee or a Bluetooth interface. The interface can further comprise an interface of a communications network, wherein the communications network can include a local area network (LAN), for example an intranet, or a wide area network (WAN). Accordingly, the one or more data interfaces can have a LAN interface or a wireless LAN interface (WLAN or Wi-Fi). The interface can be further embodied for communicating with the operator via a user interface. Accordingly, the controller can be embodied to display voice commands via the user interface and to receive user inputs relating thereto via the user interface. In particular, the interface can comprise an acoustic audio recording device for registering the audio signal and/or an image recording device.

The advantages of the proposed device substantially correspond to the advantages of the proposed method. Features, advantages or alternative embodiments/aspects can also be applied to the other claimed subject matters, and vice versa.

According to a further aspect, a medical system is provided which comprises a voice analysis device according to the preceding aspect and an above-cited medical device for performing a medical procedure.

One or more example embodiments relates in a further aspect to a computer program product which comprises a program and can be loaded directly into a memory of a programmable controller, as well as program means, e.g. libraries and help functions, in order to perform a method according to the herein-described aspects/examples/implementations/embodiments when the computer program product is executed.

One or more example embodiments also relates in a further aspect to a computer-readable storage medium on which readable and executable program sections are stored in order to perform all the steps of a method according to the herein-described aspects/examples/implementations/embodiments when the program sections are executed by the controller.

The computer program products can in this case comprise software having a source code that still needs to be compiled and linked or that only needs to be interpreted, or an executable software code that has only to be loaded into the processing unit in order to execute. The computer program products enable the methods to be performed quickly and in an identically repeatable and robust manner. The computer program products are configured in such a way that they are able to perform the inventive method steps via the computing unit. In this case the computing unit must fulfill the respective requirements, such as, for example, having a corresponding random access memory, a corresponding processor, a corresponding graphics card or a corresponding logic unit, so that the respective method steps can be performed efficiently.

The computer program products are stored for example on a computer-readable storage medium or held resident on a network or server, from where they can be loaded into the processor of the respective computing unit, which processor can be connected directly to the computing unit or can be embodied as part of the computing unit. Control information of the computer program products may also be stored on a computer-readable storage medium. The control information of the computer-readable storage medium may be embodied in such a way that it performs an inventive method when the data medium is used in a processing unit. Examples of computer-readable storage media are a DVD, a magnetic tape or a USB stick on which electronically readable control information, in particular software, is stored. When said control information is read from the data medium and loaded into a computing unit, all the inventive embodiments/aspects of the above-described methods can be performed. Thus, one or more example embodiments can also be based on the said computer-readable medium and/or the said computer-readable storage medium. The advantages of the proposed computer program products or the associated computer-readable media substantially correspond to the advantages of the proposed method.

FIG. 1 schematically shows a functional block diagram of a system 100 for performing a medical procedure on a patient. The system 100 has a medical device 1 for performing a medical procedure on a patient. The medical procedure can comprise an imaging and/or interventional and/or therapeutic procedure.

In particular, the medical device 1 can comprise an imaging modality. The imaging modality can generally be embodied to image an anatomical region of a patient when the latter is brought into an acquisition range of the imaging modality. The imaging modality is for example a magnetic resonance device, a single-photon emission tomography device (SPECT device), a positron emission tomography device (PET device), a computed tomography device, an ultrasound device, an X-ray device or an X-ray device embodied as a C-arm device. The imaging modality may also be a combined medical imaging device which comprises an arbitrary combination of several of the cited imaging modalities.

The medical device may further comprise an intervention and/or therapy device. The intervention and/or therapy device can generally be embodied to perform an interventional and/or therapeutic medical procedure on the patient. For example, the intervention and/or therapy device can be a biopsy device for taking a tissue sample, a radiation therapy or radiotherapy device for irradiating a patient, and/or an intervention device for performing an, in particular minimally invasive, intervention. According to embodiments, the intervention and/or therapy device can be automated or at least partially automated and in particular robot-controlled. The radiation therapy or radiotherapy device can comprise for example a medical linear accelerator or some other beam radiation source. For example, the intervention device can comprise a catheter robot, a minimally invasive surgical robot, a robotic endoscope, etc.

According to further embodiments, the medical device 1 can additionally or alternatively comprise modules which support the performance of a medical procedure, such as e.g. an in particular at least partially automatically controllable patient support and positioning device and/or monitoring devices for monitoring a condition of the patient, such as e.g. an ECG device, and/or a patient care device, such as e.g. a ventilator, an infusion device and/or a dialysis device.

According to embodiments of the invention, one or more components of the medical device 1 are designed to be controllable via a voice input of an operator. For this purpose, the system 100 comprises an audio recording device MIK and a voice analysis device 10.

The audio recording device MIK serves for recording or capturing an audio signal AS which can comprise spoken sounds generated by an operator of the system 100. The audio recording device MIK can be realized for example as a microphone. The audio recording device MIK can be arranged for example in a stationary manner on the medical device 1 or at another point, such as in a control room. Alternatively, the audio recording device MIK may also be realized as portable, e.g. as a microphone of a headset that can be carried around on the operator's person. In this case the audio recording device MIK advantageously includes a transmitter for wireless data communication. According to other embodiments, the audio recording device MIK is integrated into a user interface of the medical device, such as e.g. a screen of a desktop PC, a tablet or a laptop.

According to some embodiments, the audio recording device MIK can be embodied to spatially detect a source of a noise or sound, in particular a voice input, in the audio signal AS. To that end, the audio recording device MIK can comprise for example a plurality of individual microphones and/or a directional microphone. The locations of individual sources are then encoded in the audio signal AS and the sources can be evaluated via suitable voice evaluation.

In order to verify the audio signal AS or its evaluation, the inventive system 100 comprises an image recording device KAM.

The image recording device KAM is embodied for recording or capturing an image signal BS. In particular, the image signal BS contains a recorded likeness of the operator. For this purpose, the image recording device KAM can be embodied such that it can be aligned to focus on an operator. According to embodiments, the image recording device KAM can be embodied to follow an audio signal AS or to identify a source of an audio signal and to align the image recording device KAM onto the source.

The image recording device KAM can be arranged for example in a stationary manner on the medical device 1 or at another point, such as in a control room. According to other embodiments, the image recording device KAM is integrated into a user interface of the medical device, such as e.g. a screen of a desktop PC, a tablet or a laptop. The image recording device KAM may also be integrated with the audio recording device MIK.

The voice analysis device 10 has an input 31 for receiving signals and an output 32 for providing signals. The input 31 and the output 32 can form an interface device of the voice analysis device 10. The voice analysis device 10 is generally configured for performing data processing processes and for generating electrical signals. For this purpose, the voice analysis device 10 can comprise a computing unit 3. The computing unit 3 can comprise e.g. a processor, e.g. in the form of a CPU or the like. The computing unit 3 can be embodied as a central control unit, e.g. as a control unit having one or more processors. In particular, the computing unit 3 can be embodied as a control computer of the medical device 1 or as a part of the same. According to further implementations, functionalities and components of the computing unit 3 can be distributed in a decentralized manner over a plurality of computing units or controllers of the system 100.

The voice analysis device 10 further comprises a data memory 4, and specifically in particular a nonvolatile data memory that is readable by the computing unit 3, such as a hard disk drive, a CD-ROM, a DVD, a Blu-ray Disc, a floppy disk, a flash memory or the like. Software A1, A2, A3 can generally be stored in the data memory 4, which software is configured to cause the computing unit 3 to perform the steps of a herein-described method.

As shown schematically in FIG. 1, the input 31 of the voice analysis device 10 is connected to the audio recording device MIK, the image recording device KAM and the medical device 1. The input 31 can be configured for wireless or wired data communication. For example, the input 31 can have a bus link. Alternatively or in addition to a wired connection, the input 31 can also have an interface for wireless data communication. For example, a Wi-Fi interface, a Bluetooth interface or the like can be provided as such an interface.

Furthermore, a system status S1 of the medical device 1 can be provided at the input 31. The system status S1 can be given for example by a status of the medical device 1, such as e.g. a standby status, a preparation status for performing a predetermined operation or a status of performing a predetermined operation. Generally, the system status S1 is specified by a respective operating step or a succession or sequence of operating steps which the medical device 1 is currently performing or is scheduled to perform. From this, there results which further operating steps the medical device 1 could potentially perform and consequently how it can be actuated and how time-critical an actuation is. For example, the system status S1 can be supplied as an input variable to a lookup table in which the information necessary for different system statuses for actuating the medical device 1 is contained. The medical device 1 provides this system status S1 at the input 31 of the voice analysis device 10, e.g. as a data signal.

The output 32 of the voice analysis device 10 is connected to the medical device 1. The output 32 can be configured for wireless or wired data communication. For example, the output 32 can have a bus link. Alternatively or in addition to a wired connection, the output 32 can also have an interface for wireless data communication, for example a Wi-Fi interface, a Bluetooth interface or the like.

The voice analysis device 10 is configured to generate one or more control signals C1 for controlling the medical device 1 and to provide them at the output 32. The control signal C1 causes the medical device 1 to perform a specific operating step or a sequence of steps. Taking the example of an imaging modality implemented as an MR device, such steps can relate for example to the performance of a specific scan sequence having a specific excitation of magnetic fields via a generator circuit of the MR device. Furthermore, such steps can also relate to a displacement of movable system components of the medical device 1, such as e.g. the moving of a patient support and positioning device or the moving of emission or detector components of an imaging modality.

The computing unit 3 can have different modules M1-M4 for providing the one or more control signals C1.

A first module M1, referred to in the following as image analysis module M1, is embodied to determine an image analysis result BAE from the image signal BS. In this case the image analysis result BAE is suitable for facilitating or verifying the subsequent voice analysis by the further modules M2, M3, M4. In particular, the image analysis result BAE can comprise a visual identity of the operator or a visual speech activity of the operator. For this purpose, the image analysis module M1 can be embodied to apply an image or video analysis algorithm A1 to the image signal BS. The image analysis algorithm A1 can for example comprise a facial recognition function via which an identity or a lip movement of a person can be registered.

A further module M2, referred to in the following as voice analysis module M2, is embodied to determine an audio analysis result AAE from the audio signal AS. In this case the voice analysis module M2 is embodied to determine the audio analysis result AAE while taking into account the image analysis result BAE. In particular, the voice analysis module M2 can be embodied to determine (to calculate) a voice data stream containing the relevant voice commands of the operator. In particular, the voice analysis module M2 is embodied to specify a start and an end of a spoken utterance (voice input) relevant to the control of the medical device 1 within the audio signal AS via continuous analysis of the audio signal AS using the image analysis result BAE and, based on the audio signal AS, to provide the voice data stream between the start and the end. For this purpose, the voice analysis module M2 can be embodied to use a speech activity provided with the image analysis result BEA to truncate the audio signal AS in a suitable manner.

The voice analysis module M2 can be further embodied to verify a voice input contained in the audio analysis result AAE. This can for example comprise using an identity of a speaker provided with the image analysis result BAE for a check to determine whether the speaker is authorized to control the device 1. The voice analysis module M2 can also be embodied to verify the audio analysis result AAE to the effect that e.g. the voice data stream is consistent with a speech activity. Based on such checking steps, the voice analysis module M2 can provide a verification signal which can be taken into account when the audio analysis result AEE is converted into a control command.

In order to perform the above-cited tasks, the voice analysis module M2 can be embodied to apply an audio analysis algorithm A2 (first computational linguistics algorithm) to the audio signal AS. In particular, the voice analysis module M2 can be embodied (e.g. by executing the audio analysis algorithm A2) to perform method steps S41 to S46 (cf. FIG. 3).

The audio analysis result AAE and/or the verification signal can subsequently be input into a further module M3 of the computing unit 3, which is also referred to in the following as the voice recognition module M3. The voice recognition module M3 is embodied to identify one or more voice commands SB based on the audio analysis result AAE. To that end, the voice recognition module M3 can apply a voice recognition algorithm A3 (second computational linguistics algorithm) to the audio analysis result AAE, which voice recognition algorithm A3 is embodied to recognize one or more voice commands, e.g. in voice data streams. In contrast to the voice analysis module M2, the voice recognition module M3 preferably does not analyze the provided signal continuously (also virtually in real time), but in a self-contained manner as a whole. This has the advantage of a more accurate analysis result. In particular, word embeddings are detected more systematically in this way (and not only back-directed starting from a current word).

For example, the voice recognition algorithm A3 can be embodied to determine whether one or more voice commands contained in a command library 50 of the medical device 1 can be assigned to the audio analysis result AAE.

This can be effected in a rule-based manner on the basis of the signal properties of the audio analysis result AAE. The command library 50 can contain a selection of voice commands SB to which one or more signal components of the audio analysis result AAE of the operator can be assigned in each case. A signal component can in this case be a spoken utterance of the operator consisting of one or more words. According to some implementations, the command library 50 can further contain a selection of voice commands SB for the medical device 1 which is loaded from a command database 5 as a function of the current system status S1 of the medical device 1. The command library 50 is then generated temporarily for a respective system status S1 and can be loaded for example as a temporary file into a random access memory of the computing unit 3. The contents of the command library 50, i.e. the individual data records in each of which a voice command is linked to one or more signal patterns or spoken utterances, are loaded from the command database 5. Which data records are loaded into the command library 50 from the command database 5 can be dependent on the system status S1 of the medical device 1. For example, when performing a specific operation, the medical device 1 may simply perform certain other or further operating steps. This information can be stored in the command database 5 together with a voice command SB which causes a control command C1 corresponding to the operating step to be generated.

According to some implementations, the voice recognition algorithm A3 can include a recognition function trained via machine learning as software. The recognition function can be embodied to recognize one or more spoken utterances in the audio analysis result AAE and provide a corresponding recognition signal. According to some embodiments, the voice recognition algorithm A3 can be based on a transformer network or comprise such a network.

The voice commands SB are input into a further module M4, which is also referred to in the following as the command output module M4. On the basis of the voice commands SB, the command output module M4 is embodied to provide one or more control signals C1 which are suitable for controlling the medical 1 device 1 in accordance with the identified voice commands SB.

The performed subdivision into modules M1-M4 serves in this case simply for an easier explanation of the mode of operation of the computing unit 3 and is not to be understood as limiting. The modules M1-M4 or their functions may also be combined in one element. In this case the modules M1-M4 may be regarded in particular also as computer program products or computer program segments which, when executed in the computing unit 3, realize one or more of the below-described functions or method steps.

Figure 2:
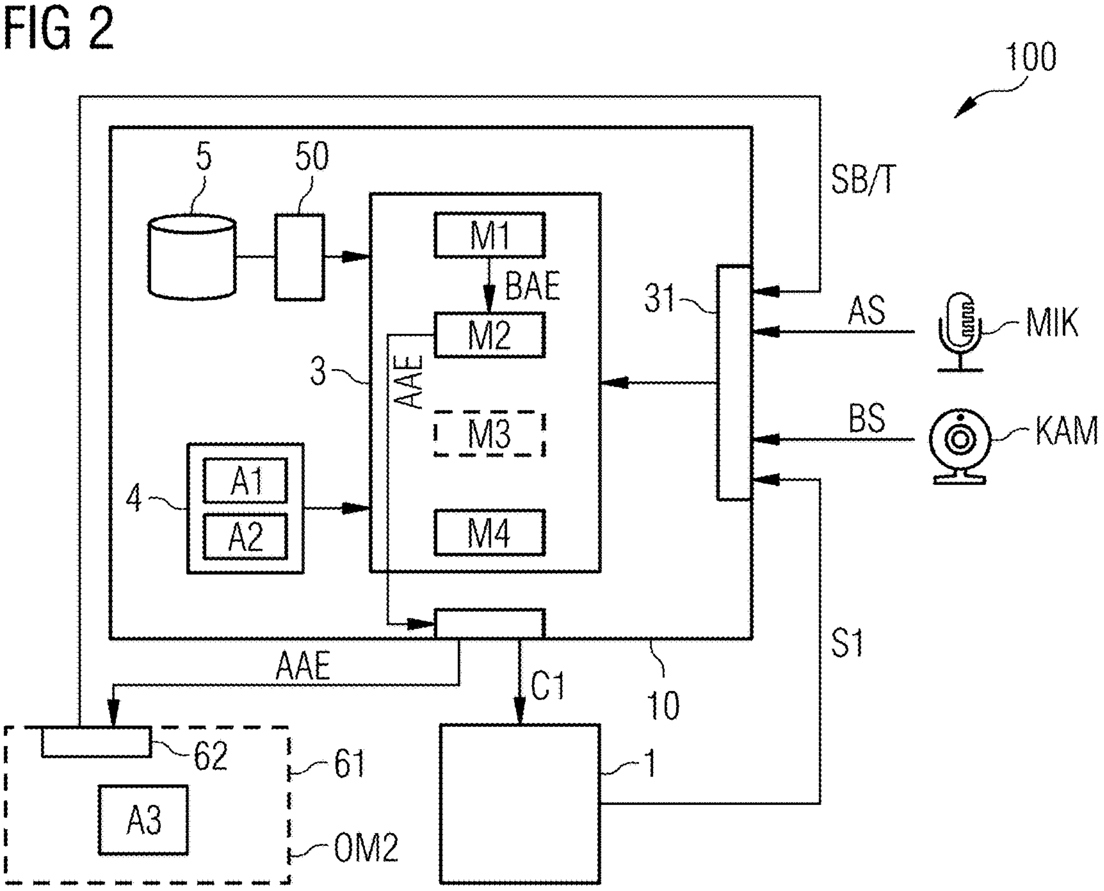
FIG. 2 shows a schematic block diagram of a system for controlling a medical device according to a further embodiment.

FIG. 2 schematically shows a functional block diagram of a system 100 for performing a medical procedure on a patient according to a further embodiment. The embodiment shown in FIG. 2 differs from the embodiment shown in FIG. 1 in that the functionalities of the voice recognition module M3 are exported at least in part into an online voice recognition module OM2. Otherwise, like reference signs denote like or functionally similar components.

The online voice recognition module OM2 can be stored on a server 61 with which the voice analysis device 10 can engage in data interchange via an internet connection and an interface 62 of the server 61. Accordingly, the voice analysis device 10 can be embodied to transmit the audio analysis result AAE to the online voice recognition module OM2. The online voice recognition module OM2 can be embodied to identify directly one or more voice commands SB on the basis of the audio analysis result AAE and return them to the voice analysis device 10. The online voice recognition module OM2 can accordingly be embodied to make the voice recognition algorithm A2 available in a suitable online memory. The online voice recognition module OM2 can in this case be regarded as a centralized device which provides voice recognition services for a number of, in particular local, clients (the voice analysis device 10 can in this sense be regarded as a local client). The use of a central online voice recognition module OM2 can be advantageous to the effect that more powerful algorithms can be applied and more computing power aggregated.

In alternative implementations, the online voice recognition module OM2 may also return "only" a transcript T of the audio analysis result AAE. The transcript T may then contain machine-interpretable text into which the audio analysis result AAE has been converted. On the basis of this transcript T, the module M3 of the computing unit 3 for example can then identify the voice commands SB. Such an embodiment can be of advantage when the voice commands SB are dependent on the circumstances of the medical device 1, to which the online voice recognition module OM2 has no access and/or for the consideration of which the online voice recognition module OM2 has not been prepared. The performance capability of the online voice recognition module OM2 is then turned to account for generating the transcript T, though otherwise the voice commands are determined within the voice analysis device 10. Depending on the embodiment of the online voice recognition module OM2, the module M3 is optional, for which reason it is indicated by a dashed outline in FIG. 2.

Figure 3:
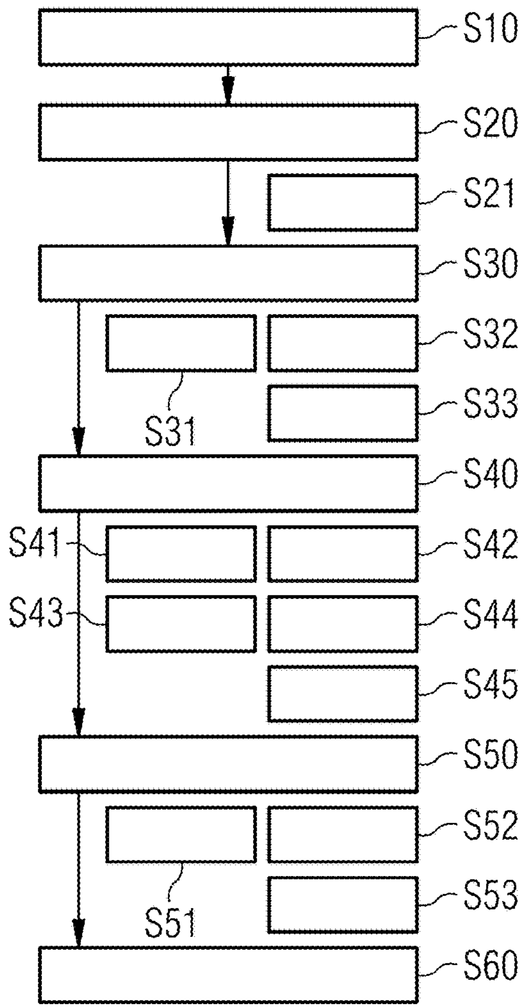
FIG. 3 shows a schematic flowchart of a method for controlling a medical device according to one embodiment.

In the systems 100 shown by way of example in FIGS. 1 and 2, the medical device 1 can be controlled via a method which is depicted by way of example as a flowchart in FIG. 3. The order of the method steps is limited neither by the depicted sequence nor by the chosen numbering. Accordingly, the order of the steps can be transposed if necessary and individual steps can be omitted.

It is generally provided in this case that the operator controlling the medical device 1 vocally or verbally issues a command, e.g. by speaking a phrase such as "start scan sequence X" or "move patient to home position", the input device 2 records and processes an associated audio signal AS, and the voice analysis device 10 analyzes the recorded audio signal AS and generates a corresponding control command C1 in order to actuate the medical device 1. An advantage of this approach is that, while speaking, the operator can also complete other tasks, e.g. deal with the preparation of the patient. This advantageously speeds up the workflows. Furthermore, it enables the medical device 1 to be controlled at least to some extent "contactlessly", thereby improving hygiene on the medical device 1.

In step S10, an audio signal AS is recorded via the audio recording device MIK. The audio signal AS can be provided to the voice analysis device 10 at the input 31 or the voice analysis device 10 can receive the audio signal AS via the input 31.

In step S20, an image signal BS is recorded via the image recording device KAM. The image signal BS can be provided to the voice analysis device 10 at the input 31 or the voice analysis device 10 can receive the image signal BS via the input 31.

In an optional substep S21, the image recording device KAM can be aligned to focus on an operator in order to take an image of the latter. To that end, the voice analysis device 10 can be embodied e.g. to identify a source of a voice input contained in the audio signal AS and to align the image recording device KAM onto the same.

In step S30, the image signal BS is analyzed in order to provide an image analysis result BAE which can be used in the further steps for the targeted voice control of the medical device 1. For example, the voice analysis device 10 can apply the image analysis algorithm A1 to the image signal BS for this purpose.

The image analysis result BAE can contain one or more components which may be useful in the subsequent processing of the audio signal AS. These components can be based on a detection of an operator and in particular of the operator's face. The image analysis algorithm A1 can therefore implement e.g. a-per se known-facial recognition algorithm.

In an optional step S31, for example, a speech activity of a person, in particular an operator, can be provided as the image analysis result BAE. For this purpose, e.g. the face of an operator can be detected and a lip movement recognized.

Furthermore, in an optional step S32, a confirmation of a presence of a person, and in particular an operator, can be provided as the image analysis result BAE. Also in step S32, an identity of a person, in particular an operator, can be provided as the image analysis result BAE.

Based on an identity of a person, in particular an operator, established in step S32, a person can be authenticated in an optional step S33 as authorized for controlling the medical device 1. In particular it can be provided in step S33 to initiate further processing steps, in particular comprising the further processing of the audio signal AS, only when at least one person authorized to operate the medical device 1 has been recognized in the image signal BS in step S33.

In step S40, the audio signal AS is analyzed using the image analysis result BAE. There is thus provided in step S40 an audio analysis result AAE on the basis of which the medical device 1 can then be controlled in the further steps.

The image analysis result BAE can in this case be used in a variety of ways for improving a processing of the audio signal AS.

On the one hand, a start and an end of a voice input can be determined in the audio signal AS based on the image analysis result BAE and in particular on a detected speech activity. As a result it can be recognized dynamically when a voice input of the operator is terminated and the comprehensive analysis of the voice input can be started (e.g. in the course of step S50). Thus, a voice data stream dynamically varying in duration depending on the voice input is generated from the audio signal AS as the audio analysis result AAE and is then supplied for further analysis in step S50.

In a first optional step S41, a start BE of a voice input of the operator is detected in the audio signal AS based on the image analysis result BAE. According to embodiments, this can happen based on a detected lip movement of the operator.

In a further optional step S42, an end EN of a voice input is detected in the audio signal AS based on the image analysis result BAE. In this case reference can be made in the same way to a detected speech activity of the operator.

In the optional step S43, the audio signal AS can then be truncated based on the detected start and the detected end and the signal between start and end is provided as the voice data stream as the audio analysis result AAE for the further processing.

In addition, a start and/or an end of a voice input can be detected on the basis of the audio signal AS itself. This can happen in an optional substep S44 by e.g. capturing signal components characteristic of natural language. Alternatively, the start and/or end of the voice input can be detected by converting the sound information contained in the audio signal AS into textual information (i.e. a transcript T) and determining the start of the voice input on the basis of the transcript T. This functionality can be implemented via a corresponding software module that is stored in the data memory 4 and causes the computing unit 3 to perform this step. The software module can be e.g. part of the audio analysis algorithm A2 or the voice recognition algorithm A3. Alternatively, a transcript T provided by the online voice recognition module OM2 can be used.

In some embodiments, a start or end of a voice input can also be detected by a combination of an analysis based on the image analysis result BAE and a direct analysis of the audio signal AS. A start and end of a voice input can thus be detected more reliably if the two analyses deliver coherent results.

On the other hand, the audio signal AS or an audio analysis result AAE can be verified based on the image analysis result BAE. Thus, in an optional step S45, a verification signal can be generated in order to verify a possible voice command contained in the audio signal AS. The verification signal can be provided for example as part of the audio analysis result AAE. If the verification signal is positive, the further processing can be continued. In particular, a voice data stream for determining one or more voice commands SB can be forwarded to the voice recognition module M3 (cf. step S50). If, on the other hand, the verification signal is negative, the audio signal AS is not analyzed further at this point and in particular is not relayed to the voice recognition module M3—at least not until a positive verification signal is present. Further details relating to the generation of the verification signal are described with reference to FIG. 4.

In step S50, one or more control commands C1 are determined from the audio analysis result AAE.

According to embodiments of the invention, one or more voice commands SB of the operator can be determined for this purpose from the audio analysis result AEE (or from the transcript T) (optional substep S51). To that end, the voice recognition algorithm A3 can be applied to the audio analysis result AEE. The voice recognition algorithm A3 can be embodied for example to recognize whether one or more voice commands SB relevant to the control of the medical device 1 are contained in the audio analysis result AEE (or in the transcript T). The voice recognition algorithm A3 can be contained for example as software in the data memory 4. In alternative embodiments, the voice recognition algorithm A3 can also be stored in the online voice recognition module OM2.

For this purpose, the voice recognition algorithm A3 can be embodied for example to determine whether one or more voice commands contained in a command library 50 of the medical device 1 can be assigned to the audio analysis result AEE (or to the transcript T). This can be realized in a rule-based manner on the basis of the signal properties of the audio analysis result AEE. The command library 50 can contain a selection of voice commands SB to which one or more signal components of the audio analysis result AEE of the operator can be assigned in each case. In this context a signal component can be a spoken utterance of the operator consisting of one or more words.

According to some implementations, the command library 50 can further contain a selection of voice commands SB for the medical device 1 which is loaded from a command database 5 as a function of the current system status S1 of the medical device 1. The command library 50 can then be generated temporarily for a particular system status S1 and loaded for example as a temporary file into a random access memory of the computing unit 3. The contents of the command library 50, i.e. the individual data records in which a voice command is linked in each case to one or more signal patterns or spoken utterances, are loaded from the command database 5. Which data records are loaded from the command database 5 into the command library 50 can be dependent on the system status S1 of the medical device 1. For example, when performing a specific operation, the medical device 1 may simply perform certain other or further operating steps. This information can be stored in the command database 5 together with a voice command SB which causes a control command C1 corresponding to the operating step to be generated. Optionally, step S50 comprises the optional step of receiving a system status S1 from the medical device (step S52).

If the voice recognition algorithm A3 is hosted in the online voice recognition module OM2, step S50 may further comprise one or more of the following substeps: an optional substep of forwarding, by the voice analysis device 10, the audio analysis result AEE to the online voice recognition module OM2, an optional substep of calculating a transcript T of the audio analysis result AEE (i.e. of converting the audio analysis result AEE into machine-readable text), an optional substep of receiving the transcript T by the voice analysis device 10 from the online voice recognition module OM2, and an optional substep of identifying one or more voice commands SB based on the received transcript T.

In the optional substep S53, one or more control signals C1 are determined for the medical device 1 based on the voice commands SB identified in step S51. For this purpose, the identified voice commands SB can be supplied for example in the form of an input variable to a command output module M4 (or to corresponding software stored for example in the data memory 4), which then causes the computing unit 3 to generate one or more control signals C1. The control signals C1 are suitable for controlling the medical device 1 according to the voice command or voice commands SB.

Finally, in step S60, the control signals C1 are forwarded or input to the medical device 1 (in order to control the same).

Figure 4:
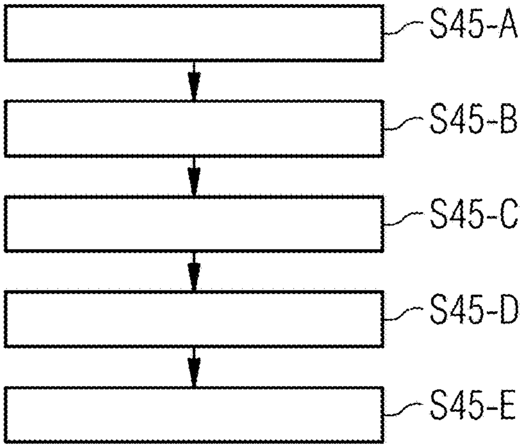
FIG. 4 shows a schematic flowchart of a method for controlling a medical device according to one embodiment.

FIG. 4 shows optional steps for generating a verification signal in the course of step S45 from FIG. 3. The individual steps are optional and can be used individually or together for generating the verification signal. The order of the method steps is limited neither by the depicted sequence nor by the chosen numbering. Accordingly, the order of the steps can be transposed if necessary and individual steps can be omitted.

In step S45-A, it can be checked based on the image analysis result BAE whether a person is present in the environment of the medical device 1 or not. If no person is present, it can be provided to analyze the audio signal AS no further. If a person is detected in an environment of the medical device 1, it is possible that a voice input to be processed is present in the audio signal AS. The processing can then be continued with the corresponding processing of the audio signal AS up to and including the providing and inputting of the control signals C1.

In step S45-B, a person can be authenticated as authorized to operate the medical device 1. If no authorized person has been identified, providing and inputting the control signals C1 can be dispensed with. A further analysis of the audio signal AS can also be omitted. If, on the other hand, an authorized person has been identified, the processing of the audio signal AS can be continued up to and including the providing and inputting of the control signals C1.

In this case a person can be authenticated based on the image signal BS or the image analysis result BAE by e.g. identifying a person via facial recognition. Alternatively or in addition, an authentication can be achieved based on the audio signal AS (e.g. as a second verification signal). The voice analysis device can in this case be embodied for example to recognize a voice signature of a person and thus identify the person. An authentication can therefore be accomplished in a variety of ways, thereby enabling the individual results to be compared with one another.

Furthermore, the generation of the verification signal can be based on whether the identities recognized based on the image signal BS and the audio signal AS are coherent, i.e. match one another. If the verification signal is negative in this regard, the further processing of the audio signal AS or of a voice data stream can be dispensed with. By this means the possibility that, when an authenticated person is present, voice inputs of a person who is likewise present but not authenticated are implemented can be ruled out.

A speech activity of a person can be provided as a further verification signal. It can be provided to continue with the processing of the audio signal up to and including the providing and inputting of the control signals C1 only if a speech activity has been detected. Otherwise, the audio signal AS would e.g. not be forwarded for the purpose of determining a voice input.

The speech activity can also be obtained both from the audio signal AS and from the image signal BS, thus allowing e.g. a mutual check to be conducted. A speech activity can thus be detected in the audio signal due to the fact that the audio signal AS contains spoken language, i.e. a voice input. This can happen for example via the correspondingly embodied voice analysis device 10. As already explained, a speech activity can be established as an image analysis result BAE for example on the basis of a lip movement of an operator.

Furthermore, the generation of the verification signal can comprise a check for a (temporal) coherence of the speech activities of a person obtained from the image signal BS and the audio signal AS. Thus, it can be checked e.g. whether lip movements and a voice input "match" one another with respect to time. If the verification signal is positive in this regard, the processing of the audio signal AS can be continued up to and including the providing and inputting of the control signals C1. Otherwise, e.g. the forwarding of the audio signal AS (or an already generated voice data stream) to the voice recognition module M3 or to the online voice recognition module OM2 can be dispensed with. By this means also it can e.g. be ruled out that voice inputs of a person different from a (possibly authenticated) operator will be processed.

All in all, a verification signal can therefore comprise one or more of the following pieces of information:

a) operator is present based on the image signal BS, b) operator shows speech activity based on the image signal BS (e.g. based on a detected lip/mouth movement), c) operator shows speech activity based on the audio signal AS (e.g. when a voice input has been detected in the audio signal AS), d) coherence of the speech activities based on audio signal AS and image signal BS (e.g. lip movements and detected voice input match one another with respect to time), e) operator is identified based on image signal BS (e.g. based on facial recognition), f) operator is identified based on audio signal AS (e.g. based on voice recognition), and/or g) coherence of the identities based on audio signal AS and image signal BS.

According to embodiments, the processing can make use of situatively different information in order to optimize and safeguard the execution of steps S40 to S60. Thus, according to some examples, the time instant of a start and end of a voice input can be determined via a different method than e.g. the authorization of the operator. For example, the start could be determined on the basis of information items b) and c), e.g. when at least one of the two associated statements is fulfilled ("b) OR c)"). Conversely, an end of the voice input can be identified when neither of the two statements is fulfilled ("neither b) nor c)"). However, the thus generated voice data stream is only forwarded to the (online) voice recognition module when the statements a), b) and c) are fulfilled at an arbitrary time instant within the voice data stream based on the verification signal.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/ or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM and/or other like computer readable drive, a memory card, storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the program computer programs, code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

While exemplary embodiments have been described in detail in particular with reference to the figures, it should be pointed out that a plurality of variations is possible. It should also be pointed out that the exemplary embodiments are simply examples which are not intended to limit the scope of protection, the application and the structure in any way. Rather, the foregoing description provides the person skilled in the art with a guide for the implementation of at least one exemplary embodiment, wherein different variations, in particular alternative or additional features and/or modification of the function and/or arrangement of the described components, can be carried out according to the wishes of the person skilled in the art without in the process departing from the subject matter set forth in each case in the appended claims or its legal equivalent and/or without leaving the scope of protection thereof.

The invention claimed is:

1. A computer-implemented method for voice control of a device comprising:

recording an audio signal via an audio recording device;

recording an image signal of an environment of the device via an image recording device;

analyzing the image signal to provide an image analysis result;

processing the audio signal using the image analysis result to provide an audio analysis result by detecting a start of a voice input in the audio signal based on the image analysis result, the audio signal including the voice input of a person, detecting an end of the voice input based on the image analysis result, and providing a voice data stream based on the audio signal between the detected start and the detected end as the audio analysis result;

generating a control signal for controlling the device based on the audio analysis result and the voice data stream; and inputting the control signal into the device, wherein the analyzing the image signal includes recognizing the person to establish an identity of the person and authenticating the person as authorized to operate the device based on the identity, the image analysis result includes the identity of the person, and the processing the audio signal, the generating the control signal, and the inputting the control signal are performed only if the person has been authenticated as authorized to operate the device.

2. The method of claim 1, wherein the image signal contains an image of the person.

3. The method of claim 2, wherein the recording the image signal comprises:

aligning the image recording device onto the person.

4. The method of claim 2, wherein the analyzing the image signal comprises:

detecting a speech activity of the person, and the image analysis result comprises the speech activity.

5. The method of claim 2, wherein the image signal is an image taken of a face of the person.

6. The method of claim 2, wherein the processing the audio signal comprises:

generating a verification signal based on the image analysis result to confirm the voice input contained in the audio signal, and the generating the control signal is based on the verification signal.

7. The method of claim 6, wherein the image analysis result comprises a detection of the person and the verification signal is based on a presence of the person.

8. The method of claim 7, wherein the image analysis result comprises a speech activity of the person and the verification signal is based on a determination of a temporal coherence of the speech activity and the voice input.

9. The method of claim 1, wherein the processing the audio signal comprises:

generating a verification signal based on the image analysis result to confirm the voice input contained in the audio signal, and the generating the control signal is based on the verification signal.

10. The method of claim 9, wherein the image analysis result comprises a detection of the person and the verification signal is based on a presence of the person.

11. The method of claim 9, wherein the image analysis result comprises a speech activity of the person and the verification signal is based on a determination of a temporal coherence of the speech activity and the voice input.

12. The method of claim 9, wherein the image analysis result comprises the identity of the person and the verification signal is based on an authentication of the person as authorized to operate the device based on the identity.

13. A non-transitory computer-readable storage medium on which readable and executable program sections are stored that, when executed by a programmable computing unit, cause the programmable computing unit to perform the method of claim 1.

14. A voice analysis device for voice control of a device comprising:

an interface configured to receive an audio signal recorded via an audio recording device and an image signal of an environment of the device recorded via an image recording device, and a control device configured to cause the voice analysis device to, analyze the image signal to provide an image analysis result, process the audio signal using the image analysis result to provide an audio analysis result by detecting a start of a voice input in the audio signal based on the image analysis result, the audio signal including the voice input of a person, detecting an end of the voice input based on the image analysis result, and providing a voice data stream based on the audio signal between the detected start and the detected end as the audio analysis result, generate a control signal to control the device based on the audio analysis result and the voice data stream, and input the control signal into the device, wherein the analyzing the image signal includes recognizing the person to establish an identity of the person and authenticate the person as authorized to operate the device based on the identity, the image analysis result includes the identity of the person, and the processing the audio signal, the generating the control signal, and the inputting the control signal are performed only if the person has been authenticated as authorized to operate the device.

15. A medical system comprising:

the voice analysis device of claim 14; and the device, wherein the device is configured to perform a medical procedure.

* * * * *